(12) United States Patent
Kostiainen et al.

(10) Patent No.: US 7,913,086 B2
(45) Date of Patent: Mar. 22, 2011

(54) METHOD FOR REMOTE MESSAGE ATTESTATION IN A COMMUNICATION SYSTEM

(75) Inventors: Kari Timo Juhani Kostiainen, Helsinki (FI); Nadarajah Asokan, Espoo (FI)

(73) Assignee: Nokia Corporation, Espoo (FI)

( * ) Notice: Subject to any disclaimer, the term of this patent is extended or adjusted under 35 U.S.C. 154(b) by 908 days.

(21) Appl. No.: 11/812,635

(22) Filed: Jun. 20, 2007

(65) Prior Publication Data

US 2008/0320308 A1 Dec. 25, 2008

(51) Int. Cl.
*H04L 29/06* (2006.01)
(52) U.S. Cl. ..................................... 713/176
(58) Field of Classification Search .................. 713/176
See application file for complete search history.

(56) References Cited

U.S. PATENT DOCUMENTS

| 7,318,235 B2 * | 1/2008 | Grawrock | 726/26 |
| 2004/0193888 A1 * | 9/2004 | Wiseman et al. | 713/176 |
| 2005/0251857 A1 | 11/2005 | Schunter | |
| 2007/0101138 A1 | 5/2007 | Camenisch | |

OTHER PUBLICATIONS

International Search Report, PCT/FI2008/050353 dated Sep. 29, 2008.
TCG; TCG Specification Architecture Overview; Mar. 28, 2007; Revision 1.3.

* cited by examiner

*Primary Examiner* — Edan Orgad
*Assistant Examiner* — Harris C Wang
(74) *Attorney, Agent, or Firm* — Harrington & Smith

(57) ABSTRACT

The invention relates to a method for remote attestation. In the method is created a first asymmetric key pair in a trusted platform module in an electronic device. A first public key and software platform state information are certified with an attestation identity key associated with the trusted platform module to produce a first certificate. A second asymmetric key pair is produced in an application within the electronic device. The second public key is certified with said first secret key to produce a second certificate. A message is signed with the second secret key to provide a message signature in the first electronic device. The message and the message signature, software platform state information, the first certificate and the second certificate are sent to a second electronic device.

23 Claims, 5 Drawing Sheets

METHOD FOR REMOTE MESSAGE ATTESTATION IN A COMMUNICATION SYSTEM

BACKGROUND OF THE INVENTION

1. Field of the Invention

The invention relates to computer system security and communication systems. The invention relates also to a trusted platform module. Particularly, the invention relates to a method for the remote attestation of messages in a communication system.

2. Description of the Related Art

Computer system security has become a very important topic nowadays. It has become important not only to authenticate the origin of a message, to authenticate the sender of the message or to ensure the message is not eavesdropped, but it is important to ensure the software configuration of the device that sent the message. Otherwise, there exists the possibility, for example, that the device of the sender is running an operating system or a protocol stack that has been corrupted with malicious software components. In some cases it is just verified that the device of the sender is running a potentially secure or well-known operating system environment with the components expected.

Traditional security policies are based on the identification and authentication of devices or user identities associated with the devices. A user is associated with a device, for example, using a Subscriber Identity Module (SIM). When, for example, a remote user establishes a connection to a corporate intranet, a Virtual Private Network (VPN) gateway typically identifies and authenticates the remote user before granting or denying the connection. In many cases it is useful to verify other attributes of the remote device in addition to its identity. One such attribute is the software configuration of the remote device. In the case of corporate intranet access the VPN gateway could, for example, verify that the remote device is running a correct operating system and a correct network stack with the latest security updates before granting access to the corporate intranet. This process of verifying the software configuration of a remote device is called remote attestation.

The Trusted Computing Group (TCG) has specified a hardware security component called the Trusted Platform Module (TPM). Trust may be defined as the expectation that a device will act in a particular manner for a given purpose. A TPM is a module, for example, connected to the controller of a device, the trust of which is to be determined. A TPM provides an interface that comprises protected capabilities, which are commands with exclusive access to a number of shielded locations. Shielded locations may be registers or memory locations. In a TPM there are also stored cryptographic keys that may be used by the TPM to authenticate measurements obtained from the TPM. The TPM is used to obtain attestation that a device may be trusted. Attestation is the process of vouching for the accuracy of information. The TPM provides signed reports, for example, that report measurements of the local configuration like the operating system and the standard applications in the device. The measurements start from a core root of trust for measurement that is trusted in the device. After that, each software layer measures the next software layer in the device. The measurements may be, for example, hash values computed of software components or configuration files loaded. The TPM comprises a number of Platform Configuration Registers (PCR). For example, a subset of the PCRs is dedicated to the operating system of the device, to which the TPM is connected, whereas the rest are dedicated to the standard applications in the device. The standard applications comprise, for example, the protocol stacks and a number of communication applications. Initially, before the system is booted, the PCRs have zero or other initial values. As a software component is loaded, a first hash value is computed of the software component code. The first hash value and the initial value of the PCR associated with the software component are used as arguments in a hash function to compute a new value, that is, a second value for the PCR. A number of different software components may be associated with a single PCR. Subsequently, always when a new software component associated with the PCR is loaded or updated, the PCR is extended, which means that the current PCR value is used together with a hash value computed of the new software component as an argument for a hash function to compute the new value for the PCR. The value of a PCR is never set directly to a new value without taking into consideration the existing value.

The TPM module and the remote attestation protocol specified by the TCG group enable interactive remote attestation. In interactive remote attestation the target device, such as the VPN gateway, sends a challenge to the remote device. The TPM module on the remote device reads its internal platform configuration registers (PCRs) that contain measurements of the software the remote device is running. After that, the TPM module signs the PCR values and the received challenge using its internal key called Attestation Identity Key (AIK). The signed response containing the PCR values is sent back to the target device. The target device may then check that the remote device is running the correct software configuration by comparing the received PCR values against expected values. The target device gets a list of valid AIKs from a trusted third party. If the response was signed with a valid AIK, the target device knows that the response was generated by a proper TPM module and the received PCR values may be trusted.

Interactive remote attestation works in scenarios in which immediate end-to-end connectivity can be assumed between the remote and target devices. However, there are several situations in which this assumption is false. One example is store-and-forward messaging like e-mail, in which it may not be feasible to have intermediate forwarding nodes, that is, target devices in the attestation sense to interact with the original message sender, that is, the remote device in the attestation sense. Communication in rural areas is another example of Delay- and Disruption Tolerant Networking (DTN), in which immediate end-to-end connectivity is not always available.

The general problem is as follows: A sender S sends a message m to a recipient R. The message needs to be carried by several intermediaries $D1, \ldots, Dn$ before being delivered to R. Each Di and finally R may want to take measures to protect themselves from abuses like spam and flooding. One way to do this is to verify the authenticity of the sender. But this may not be possible or desirable, for example, due to privacy reasons. A complementary method is to verify that m was sent by a well-known software configuration trusted by the verifier, that is, Di or R. For example, the well-known software configuration may have built in mechanisms to prevent or at least report abuses. One such reporting mechanism is a message header stating how many messages were sent out in the last hour. What is needed is an efficient and secure mechanism for a verifier to check that m was indeed sent by a given well-known software configuration running on some possibly unknown sender's device.

SUMMARY OF THE INVENTION

The invention relates to a method, comprising: creating a first asymmetric key pair in a trusted platform module of a first electronic device, said first asymmetric key pair comprising a first public key and a first secret key; associating said first public key with software platform state information within said first electronic device; certifying said first public key and said software platform state information with an attestation identity key associated with said trusted platform module to produce a first certificate; creating a second asymmetric key pair in an application within said first electronic device, said second asymmetric key pair comprising a second public key and a second secret key; certifying said second public key with said first secret key to produce a second certificate; signing a message with the second secret key to provide a message signature in said first electronic device; providing said message and said message signature to a second electronic device; and providing said software platform state information, said first certificate and said second certificate to said second electronic device.

The invention relates also to an electronic device, comprising: an application entity configured to create a second asymmetric key pair, said second asymmetric key pair comprising a second public key and a second secret key, to sign a message with the second secret key to provide a message signature in said electronic device; a trusted platform module configured to create a first asymmetric key pair, said first asymmetric key pair comprising a first public key and a first secret key, to associate said first public key with software platform state information, to certify said first public key and said software platform state information with an attestation identity key associated with said trusted platform module in order to produce a first certificate, and to certify said second public key with said first secret key to produce a second certificate; a communication entity configured to provide said message and said message signature to a second electronic device and to provide said software platform state information, said first certificate and said second certificate to said second electronic device.

The invention relates also to an electronic device, comprising: means for creating a first asymmetric key pair in a trusted platform module of an electronic device, said first asymmetric key pair comprising a first public key and a first secret key; means for associating said first public key with software platform state information within said electronic device; means for certifying said first public key and said software platform state information with an attestation identity key associated with said trusted platform module to produce a first certificate; means for creating a second asymmetric key pair in an application within said electronic device, said second asymmetric key pair comprising a second public key and a second secret key; means for certifying said second public key with said first secret key to produce a second certificate; means for signing a message with the second secret key to provide a message signature in said electronic device; means for providing said message and said message signature to a second electronic device; and means for providing said software platform state information, said first certificate and said second certificate to said second electronic device.

The invention relates also to a system comprising: a first electronic device configured to create a first asymmetric key pair in a trusted platform module of a first electronic device, said first asymmetric key pair comprising a first public key and a first secret key, to associate said first public key with software platform state information within said first electronic device, to certify said first public key and said software platform state information with an attestation identity key associated with said trusted platform module to produce a first certificate, to create a second asymmetric key pair in an application within said first electronic device, said second asymmetric key pair comprising a second public key and a second secret key, to certify said second public key with said first secret key to produce a second certificate, to sign a message with the second secret key to provide a message signature in said first electronic device, to provide said message and said message signature to a second electronic device, and to provide said software platform state information, said first certificate and said second certificate to said second electronic device; and a second electronic device configured to verify said message signature with said first certificate and said second certificate in said second electronic device in order to verify the software configuration of the first electronic device and that the first electronic device is the sender of the signed message.

The invention relates also to a computer program embodied on a computer readable medium, the computer program comprising code for controlling a processor to execute a method comprising: creating a first asymmetric key pair, said first asymmetric key pair comprising a first public key and a first secret key; associating said first public key with software platform state information within an electronic device; certifying said first public key and said software platform state information with an attestation identity key to produce a first certificate; creating a second asymmetric key pair, said second asymmetric key pair comprising a second public key and a second secret key; certifying said second public key with said first secret key to produce a second certificate; signing a message with the second secret key to provide a message signature in a first electronic device; providing said message and said message signature to a second electronic device; and providing said software platform state information, said first certificate and said second certificate to said second electronic device.

The invention relates also to a computer program comprising code for controlling a processor to execute a method comprising: creating a first asymmetric key pair, said first asymmetric key pair comprising a first public key and a first secret key; associating said first public key with software platform state information within an electronic device; certifying said first public key and said software platform state information with an attestation identity key to produce a first certificate; creating a second asymmetric key pair, said second asymmetric key pair comprising a second public key and a second secret key; certifying said second public key with said first secret key to produce a second certificate; signing a message with the second secret key to provide a message signature in a first electronic device; providing said message and said message signature to a second electronic device; and providing said software platform state information, said first certificate and said second certificate to said second electronic device.

In one embodiment of the invention, the attestation identity key is the secret key within an asymmetric attestation identity key pair.

In one embodiment of the invention, said message and said message signature are provided to a second electronic device in a single message together with said software platform state, information, said first certificate and said second certificate to said second electronic device. In one embodiment of the invention, said software platform state information, said first certificate and said second certificate to said second electronic device are provided to the second electronic device in a separate message.

In one embodiment of the invention, a second electronic device is configured to verify said message signature with said first certificate and said second certificate in said second electronic device in order to verify the software configuration of the first electronic device and that the first electronic device is the sender of the signed message.

In one embodiment of the invention, the electronic device further comprises an operating system entity configured to boot said electronic device. The electronic device further comprises said trusted platform module configured to determine current software platform state and to providing said second secret key to said application entity from said trusted platform module if said current software platform state matches said software platform state information.

In one embodiment of the invention, the electronic device further comprises said trusted platform module configured to associate said second secret key with said software platform state information and to store said second secret key in association with said software platform state information in a permanent storage.

In one embodiment of the invention, the electronic device further comprises the permanent storage, which may be comprised in a secondary memory, for example, as a disk partition, directory or a file. The permanent storage may be at least part of the storage space of a computer readable medium such as a flash memory, a magnetic or an optic disk.

In one embodiment of the invention, the electronic device further comprises said trusted platform module configured to store said first certificate and said second certificate in a permanent storage within the electronic device.

In one embodiment of the invention, the electronic device further comprises said trusted platform module configured to compute hash values for at least one register with the program code of at least one software component, to use said hash values to determine new values for the at least one register, and to represent said software platform state information with the values of said at least one register. The hash values for the at least one register may be computed by the operating system within the electronic device and provided from there to the trusted platform module, which determines from the hash values the new values for the at least one register.

In one embodiment of the invention, said trusted platform module is configured to reserve at least one register among said at least one register for an operating system.

In one embodiment of the invention, said trusted platform module is configured to reserve at least one register among said at least one register for a communication application.

In one embodiment of the invention, when signing keys and software platform state information, a hash value may be computed of a key to be signed and the software platform state information. A cryptographic transform is then applied to the hash value using the signing key. In one embodiment of the invention, a hash value is computed of the software platform state information before concatenation to a key to be signed. In one embodiment of the invention, the software platform state information comprises at least one platform configuration register value.

In one embodiment of the invention, a cryptographic transform, in other words, a signing transformation algorithm is an encryption or a decryption algorithm. In one embodiment of the invention, a cryptographic transform is an algorithm separate from encryption or decryption algorithms.

In one embodiment of the invention, a cryptographic transform is used when at least one value is certified with a signing key.

In one embodiment of the invention, said electronic device comprises a communication network node.

In one embodiment of the invention, said electronic device comprises a mobile communication device, that is, a mobile terminal.

In one embodiment of the invention, the system comprises a packet switched network, for example, an Internet Protocol (IP) network. A network address may be an IP address.

In one embodiment of the invention, said communication system comprises a mobile communication network. In one embodiment of the invention, said mobile terminal comprises a mobile station. In one embodiment of the invention, the communication system comprises at least one of a Global System of Mobile Communications (GSM) network and a Universal Mobile Telephone System (UMTS) network. The mobile terminal may be, for example, a GSM mobile station or a UMTS mobile station with a dual mode or multimode functionality to support different access types.

In one embodiment of the invention, the computer program is stored on a computer readable medium. The computer readable medium may be a removable memory card, magnetic disk, optical disk or magnetic tape.

The embodiments of the invention described hereinbefore may be used in any combination with each other. Several of the embodiments may be combined together to form a further embodiment of the invention. A method, a system, an electronic device or a computer program to which the invention is related may comprise at least one of the embodiments of the invention described hereinbefore.

The benefits of the invention are related to improved efficiency in the signing, in other words, digital signing of messages and remote attestation. The invention enables attestation when there is no direct end-to-end connectivity between the first electronic device and the second electronic device.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
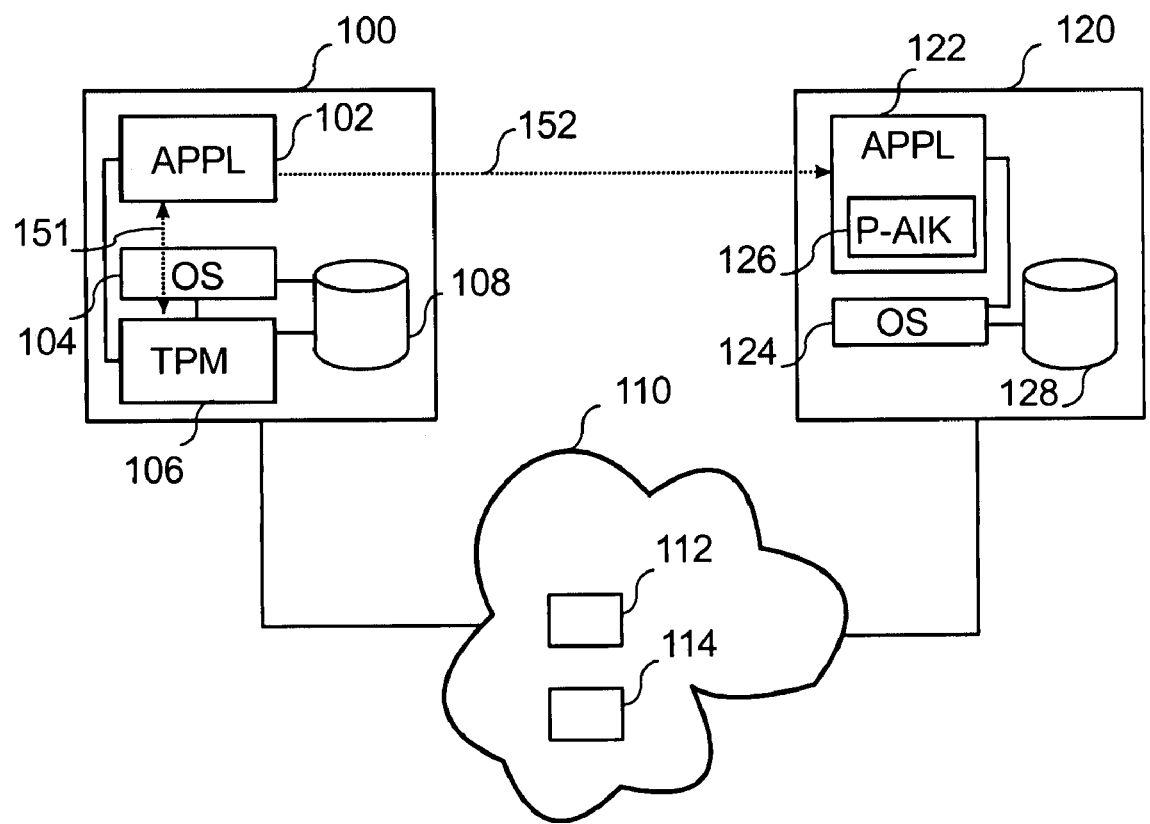
FIG. 1 is a block diagram illustrating a communication system applying remote attestation in one embodiment of the invention.

FIG. 1 is a block diagram illustrating a communication system applying remote attestation in one embodiment of the invention. In FIG. 1 there is a network 110. To network 110 there is connected a network node 100, which acts as a remote node from attestation perspective, and a network node 120, which acts as a target node from attestation perspective. Messages sent from network node 100 to network node 120 may be transmitted via at least one intermediate node such as intermediate node 112 or intermediate node 114. Network node 100 comprises an application 102, an operating system 104 and a Trusted Platform Module (TPM) 106. Operating system 104 and TPM 106 are configured to communicate with a permanent storage 108. Network node 120, on the other hand, comprises an application 122, an operating system 124 and a copy of the public part (P-AIK) 126 of an Attestation Identity Key (AIK). It should be noted that network node 120 does not require a TPM for the attestation. Operating system 124 is configured to communicate with a permanent storage 128.

Interaction between application 102 and TPM 106 is illustrated with double-headed arrow 151. First, in order to be able to dispatch messages from network node 100 to network node 120, application 102, during an initialization phase, asks TPM 106 to create a first key pair comprising a first public key and a first secret key, in other words, a public key and a private key. The first key pair is bound to the PCR values corresponding to application 102. Thereupon, application 102 requests from TPM 106 a publicly verifiable certificate. The publicly verifiable certificate allows anyone to verify that the first public key and its matching secret key is certifiably bound to the mentioned PCR values. Thereupon, application 102 requests TPM 106 to sign a certificate with the first secret key in order to bind the first secret key to a second public key. Thereupon, application 102 creates a message and uses a second secret key to sign the message.

The message is also appended with TPM measurements pertaining to at least one of operating system 104 and application 102. The platform configuration register values obtained using the TPM measurements are also appended to the message together with a certificate provided from TPM 106 for the platform configuration register values. The message is sent to network node 120 as illustrated with arrow 152. Upon receiving the message, network node 120 verifies the software configuration of network node 100 by verifying the signature of the message against a certificate binding the public key and the matching secret key in the first key pair to the PCR values certified by the AIK public key and a certificate for the public key in the second key pair binding it to the secret key in the first key pair. Thus, the remote attestation is concluded.

Figure 2A:
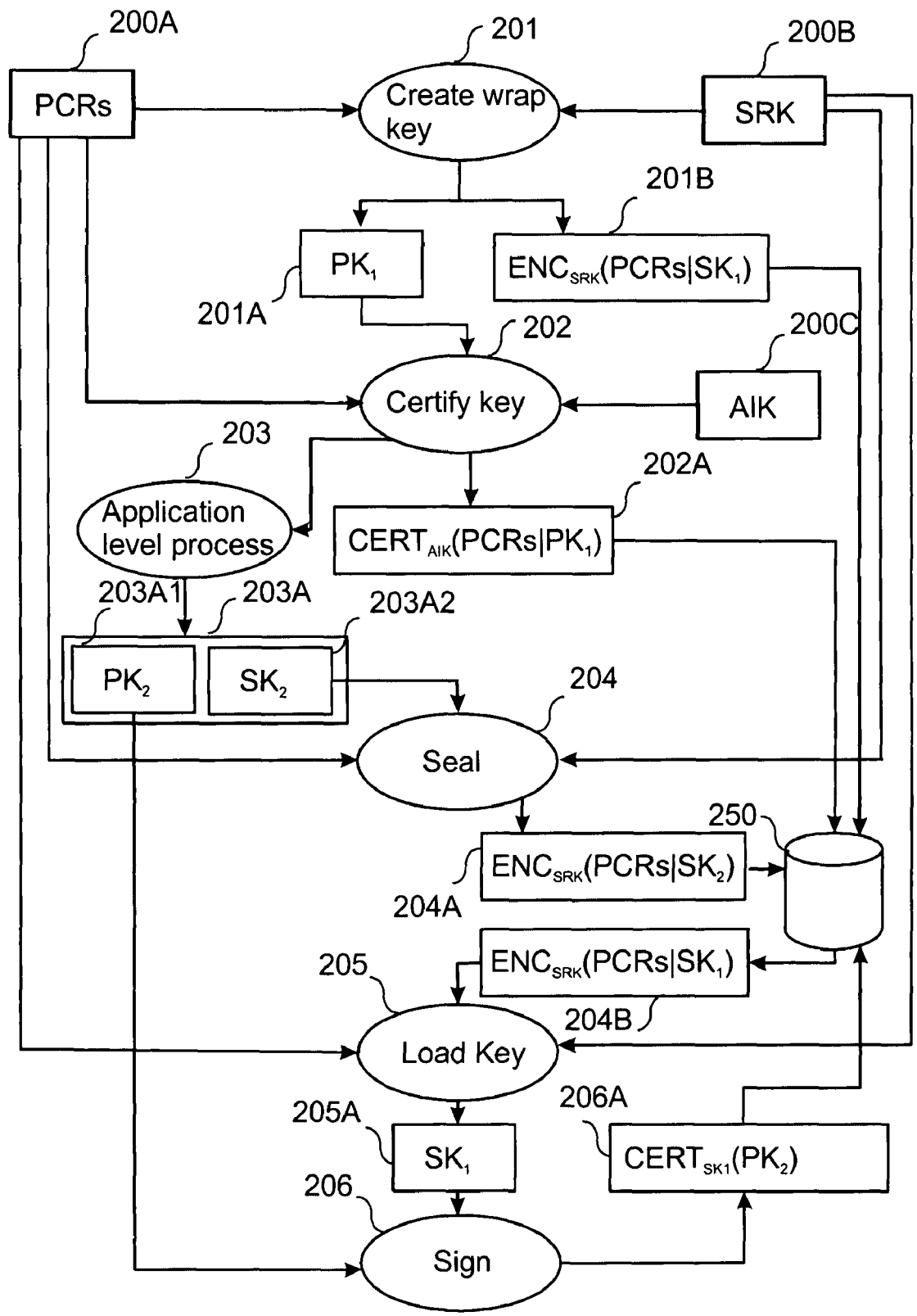
FIG. 2A is a flow chart illustrating a system set-up phase on a remote device in one embodiment of the invention.

FIG. 2A is a flow chart illustrating a system set-up phase on a remote device in one embodiment of the invention. The method steps are illustrated with ellipses and information provided to or obtained from a method step is illustrated with a rectangle. The method steps follow each other in a top-down order in the direction of the arrows. In one embodiment of the invention the method steps are performed in a network node similar to network node 100 in FIG. 1. The device comprises at least an operating system, a TPM and at least one application. The device also comprises a permanent storage 250.

At step 201, at the request of an application, the TPM creates a first key pair, which is an asymmetric key pair that comprises a first public key $PK_1$ and a first secret key $SK_1$. The input to step 201 are PCR values 200A and a Storage Root Key (SRK) 200B. First public key $PK_1$ is illustrated with rectangle 201A. The use of first secret key $SK_1$ is bound to PCR values 200A, which represent the current PCR values obtained from the current measurements formed using the operating system of the remote device and at least one application program in the remote device. First secret key $SK_1$ is concatenated with PCRs as illustrated in rectangle 201B. The concatenation is illustrated with the character "|". First public key $PK_1$ is returned as a clear text field 201A from TPM to an application. The first secret key is returned as an encrypted field 201B comprising PCR values 200A and the first secret key encrypted with SRK 200B. Instead of SRK 200B, a different storage key, which is protected by a sequence of keys ending with the SRK, may be used for encryption. Encrypted field 201B is stored to permanent storage 250 by the TPM or by the application.

At step 202, TPM is used by the application to sign first public key 201A. The signing provides a certificate 202A for first public key 201A. First public key $PK_1$ is thus certified. TPM uses first public key 201A, PCR values 200A and an Attestation Identity Key (AIK) 200C. In one embodiment of the invention, AIK 200C is the secret key within an asymmetric AIK key pair. In certificate 202A, PCR values 200A and first public key 201A are concatenated and cryptographically transformed with AIK 200C. Certificate 202A, also referred herein as the first certificate, that is, $CERT_1$, is stored to permanent storage 250 by the application or the TPM for later use. The application is also informed of the completion of the signing in TPM.

In one embodiment of the invention, when signing keys and PCR values, a hash value may be computed of a key to be signed and the PCR values and the hash value is then provided as an argument to a cryptographic transformation algorithm that computes the signature from the argument with a signing key. In one embodiment of the invention, a hash value is computed of the PCR values before concatenation to a key to be signed.

At step 203, the application creates a second key pair 203A, comprising a second public key $PK_2$ and a second secret key $SK_2$. Second public key $PK_2$ is illustrated with rectangle 203A and the second secret key $SK_2$ is illustrated with rectangle 203A2.

At step 204, second secret key 203A2 is provided to the TPM, which seals second secret key $SK_2$. The sealing uses second secret key 203A2, PCR values 200A and SRK 200B. The sealing provides an encrypted field 204A, which comprises PCR values 200A and second secret key 203A2 concatenated and encrypted with SRK 200B. Field 204A is stored to permanent storage 250 by the application or the TPM. Later, the TPM will decrypt the encrypted second secret key $SK_2$ and give it to the application only if the PCR values obtained by decryption of field 204A match the PCR values of the device at that moment. At this stage both key pairs have been created. It should be noted that TPM may not see second secret key 203A2 as specifically a key, but as mere arbitrary data to be sealed.

At step 205, the TPM is given a command to load a key provided in an encrypted field 204B, which corresponds to encrypted field 201B and comprises PCR values and the first secret key $SK_1$ encrypted with SRK 200B. The loading uses encrypted field 204B, PCR values 200A and SRK 200B. The loading succeeds only if the TPM detects that current PCR values 200A match the PCR values in encrypted field 204B. This means that the system must still have the same secure software configuration. The result of step 205 is first secret key $SK_1$ as illustrated with rectangle 205A. As soon as first secret key $SK_1$ has been loaded, it may be used in the TPM to sign second public key $PK_2$.

At step 206, the TPM is used by the application to sign second public key $PK_2$ as illustrated with rectangle 203A1. The signing uses the loaded first secret key $SK_1$ illustrated with rectangle 205A and second public key $PK_2$ as illustrated with rectangle 203A1. The result of the signing is a cryptographically transformed field 206A, which comprises second public key $PK_2$ cryptographically transformed with first secret key $SK_1$. Cryptographically transformed field 206A is referred also as the second certificate, that is, $CERT_2$. Cryptographically transformed field 206A is stored to permanent storage 250 by the application or the TPM.

Figure 2B:
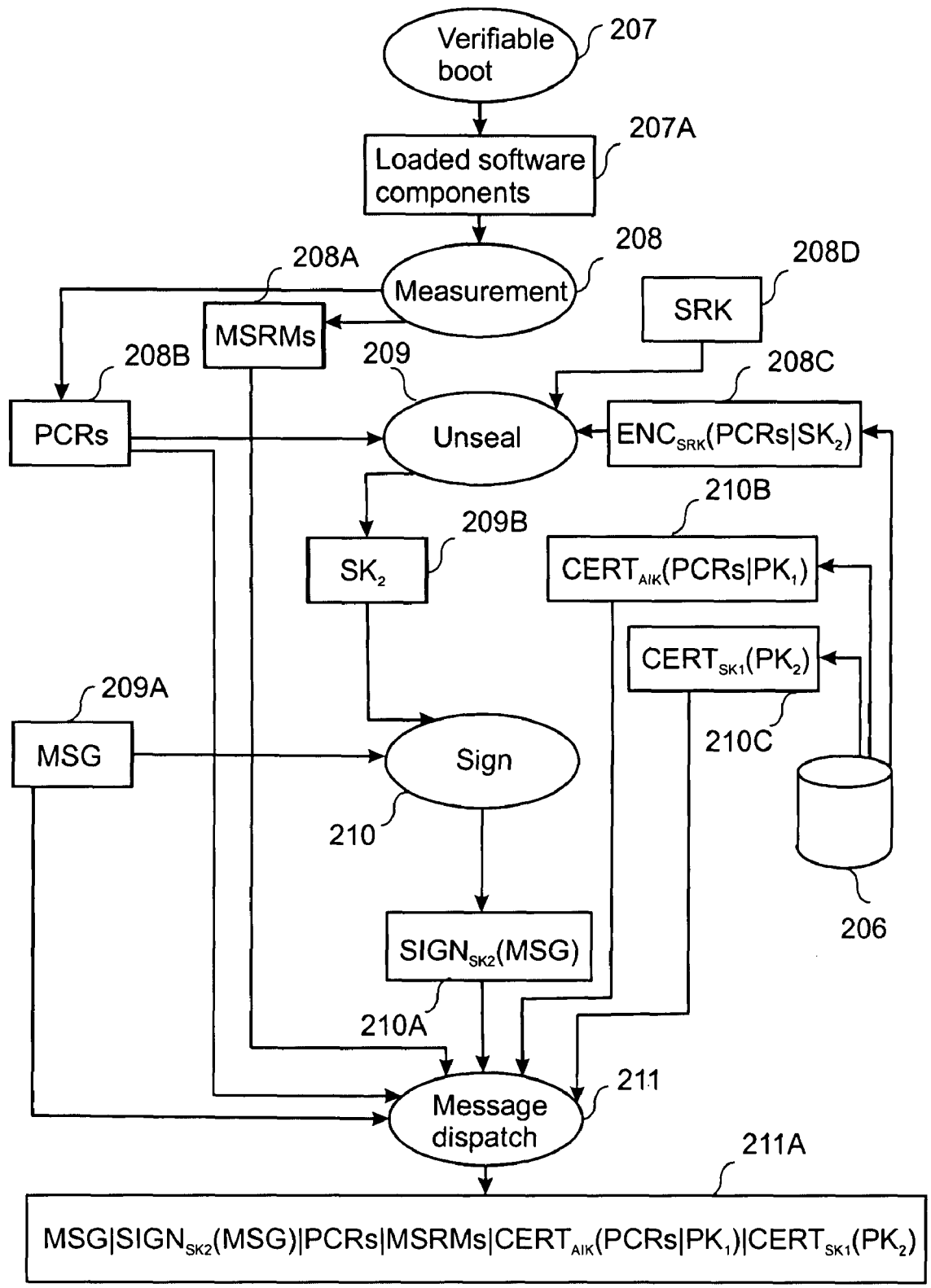
FIG. 2B is a flow chart illustrating a boot and message sending phase a remote device in one embodiment of the invention.

FIG. 2B is a flow chart illustrating a boot and message sending phase a remote device in one embodiment of the invention. The method steps are illustrated with ellipses and information provided to or obtained from a method step is illustrated with a rectangle. The method steps follow each other in a top-down order in the direction of the arrows. In one embodiment of the invention the method steps are performed in a network node similar to network node 100 in FIG. 1. The device comprises at least an operating system, a TPM and at least one application. The device also comprises a permanent storage 250.

At step 207, a verifiable boot is performed in the device. The result is at least one loaded software component as illustrated with rectangle 207A.

At step 208, a measurement phase is performed by the TPM. In the measurement phase hash values are computed of the program codes for the at least one software component loaded. The hash values obtained are illustrated as rectangle 208A. The hash values obtained are also used to set the PCR values of the TPM illustrated with rectangle 208B. Thereupon, the unsealing step is performed.

At step 209, an encrypted field 208C is read from the permanent storage 250. Encrypted field 208C comprises the PCR values at the time of the sealing step and second secret key $SK_2$ encrypted with a Storage Root Key (SRK) 208B. The unsealing process uses PCR values 208B, SRK 208D and encrypted field 208C. The unsealing process succeeds only if the decrypted PCR values from encrypted field 208C match current PCR values 208B. This verifies that the device has the same software configuration as at the time of the sealing and thus remains intact. The result of the unsealing is the second secret key $SK_2$, as illustrated with rectangle 209B. After this, an extend command may be given to the TPM in order to extend PCR values 208B. The purpose of the extension is to render the second secret key unavailable for other processes. As TPM based verified booting is used, only secure software components loaded during the boot will be allowed to have the right to use $SK_1$ or the right to retrieve $SK_2$. Verified booting means that any software can be booted, but only the correct software, that is, software which matches the expected PCR values, will be allowed access to TPM keys like $SK_1$ or sealed data like $SK_2$. Thus, a trusted protocol stack or a communication application is the first process to decrypt the second secret key $SK_2$. The trusted protocol stack or the communication application is expected to keep the second secret key safe from other possibly malicious processes during the existence of the trusted process.

At step 210, the application signs a message 209A with second secret key 209B. The result is a hash of the message processed with a signing transformation algorithm using the second secret key $SK_2$, as illustrated with rectangle 210A.

At step 211, the message is sent to a target device, for example, network node 120 in FIG. 1. The message dispatching uses the message 209A, signature 210A, PCR values 208B, measurements 208A, first certificate 210B and second certificate 210C. These elements are put to a message, which is sent to the target device. Thereupon, the method is considered finished in the remote device side, that is, the device that sent the message.

The recipient may verify the software configuration of the sender by verifying the signature of the received message against first certificate 210B and second certificate 210C. This is possible, because first certificate 210B binds the first key pair to the software configuration by AIK 200C and second certificate 210C binds the second key pair to the first key pair. In other words, the first certificate is a statement by AIK that $PK_1$ is bound to the specified PCR values. Thus, there is a chain of trust from the AIK to the second key pair which is used to sign the messages sent. If the target device trusts AIK, the measurements in the message can be securely verified. The target device is expected to be able to verify the trustworthiness of the AIK from a trusted third party.

Figure 3:
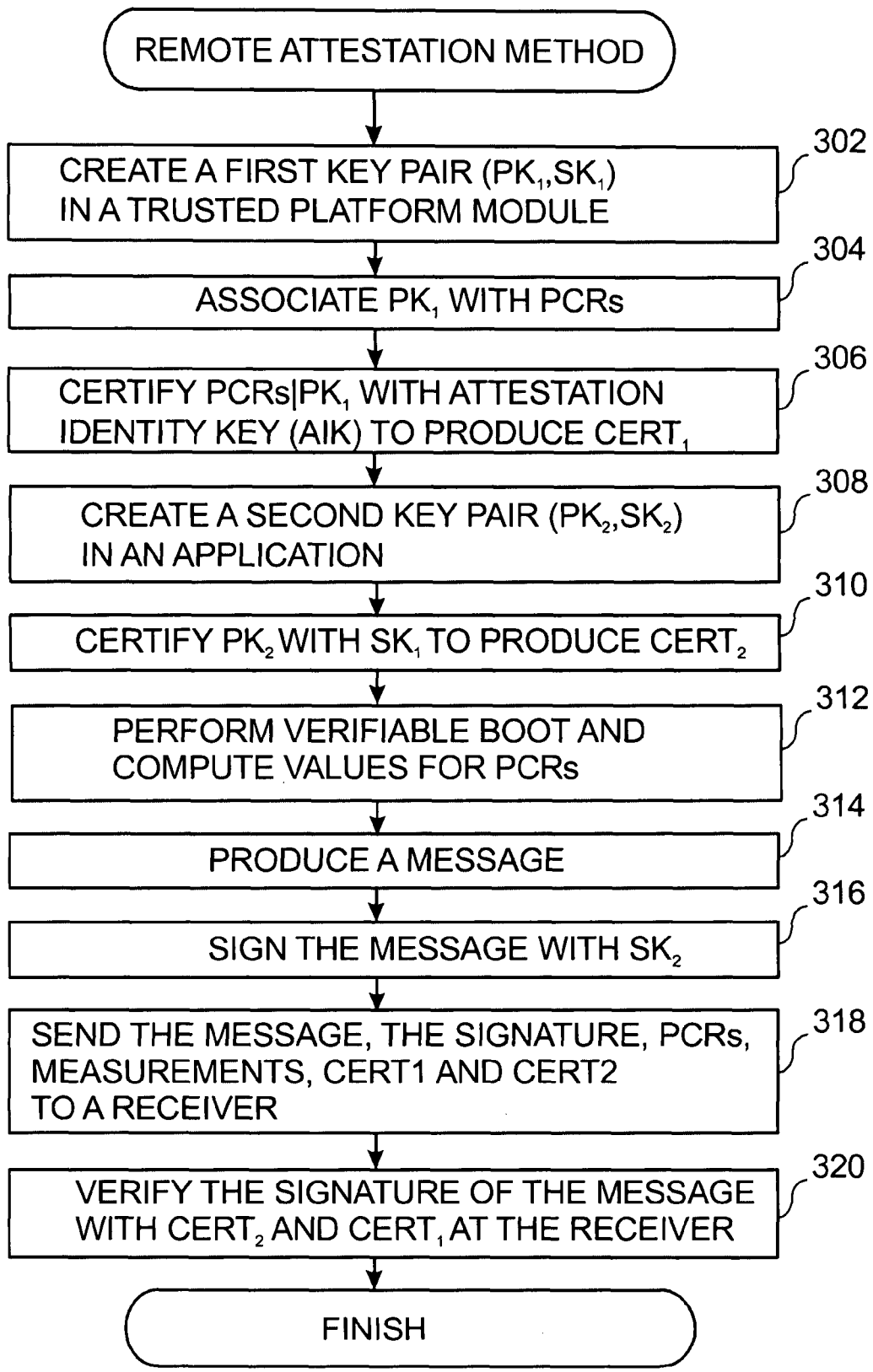
FIG. 3 is a flow chart illustrating a remote attestation method in one embodiment of the invention.

FIG. 3 is a flow chart illustrating a method for remote attestation in one embodiment of the invention.

At step 302, a first key pair comprising a first public key $PK_1$ and a first secret key $SK_1$ is created in a trusted platform module associated with a first device.

At step 304, first public key $PK_1$ is associated with the PCR values within the trusted platform module. The association may be, for example, the concatenating of PCR values to $PK_1$. The concatenation operation is illustrated with the character "|".

At step 306, the concatenation PCR|$PK_1$ is signed with an Attestation Identity Key (AIK) to produce a first certificate $CERT_1$. In one embodiment of the invention, first certificate $CERT_1$ is stored to a permanent storage.

At step 308, a second key pair comprising a second public key $PK_2$ and a second secret key $SK_2$ is created in an application, that is, outside the trusted platform module.

At step 310, second public key $PK_2$ is certified with first secret key $SK_1$ to produce a second certificate $CERT_2$. In one embodiment of the invention, second certificate $CERT_2$ is stored to the permanent storage.

At step 312, the first device performs a verifiable boot and computes the PCR values for the trusted platform module from at least part of the software configuration within the first device.

At step 314, message data is composed within the first device. The message data may be carried, for example, in an E-mail message, in an instant message or generally in a data packet.

At step 316, the message data is signed with second secret key $SK_2$. This comprises, for example, that a hash function is computed of the message data. The resulting value returned by the hash function is then processed with a signing transformation algorithm using second secret key $SK_2$ to produce the signature for the message data.

At step 318, the message data, the signature for the message data, the PCR values, first certificate $CERT_1$ and second certificate $CERT_2$ are sent to a second device as a message. The message may traverse a number of intermediate network nodes before it reaches the second device. In one embodiment of the invention, software configuration measurement values are also sent to the second device in the message.

At step 320, the second device verifies the signature for the message data with the first certificate $CERT_1$ and the second certificate $CERT_2$. The second certificate $CERT_2$ certifies the second public key $PK_2$ and the first certificate $CERT_1$ certifies the first public key $PK_1$. The first certificate is trusted based on the attestation identity key obtained by the second device in a trustworthy manner. Thereupon, the second device may consider the message as remotely attested and the method is finished.

Figure 4:
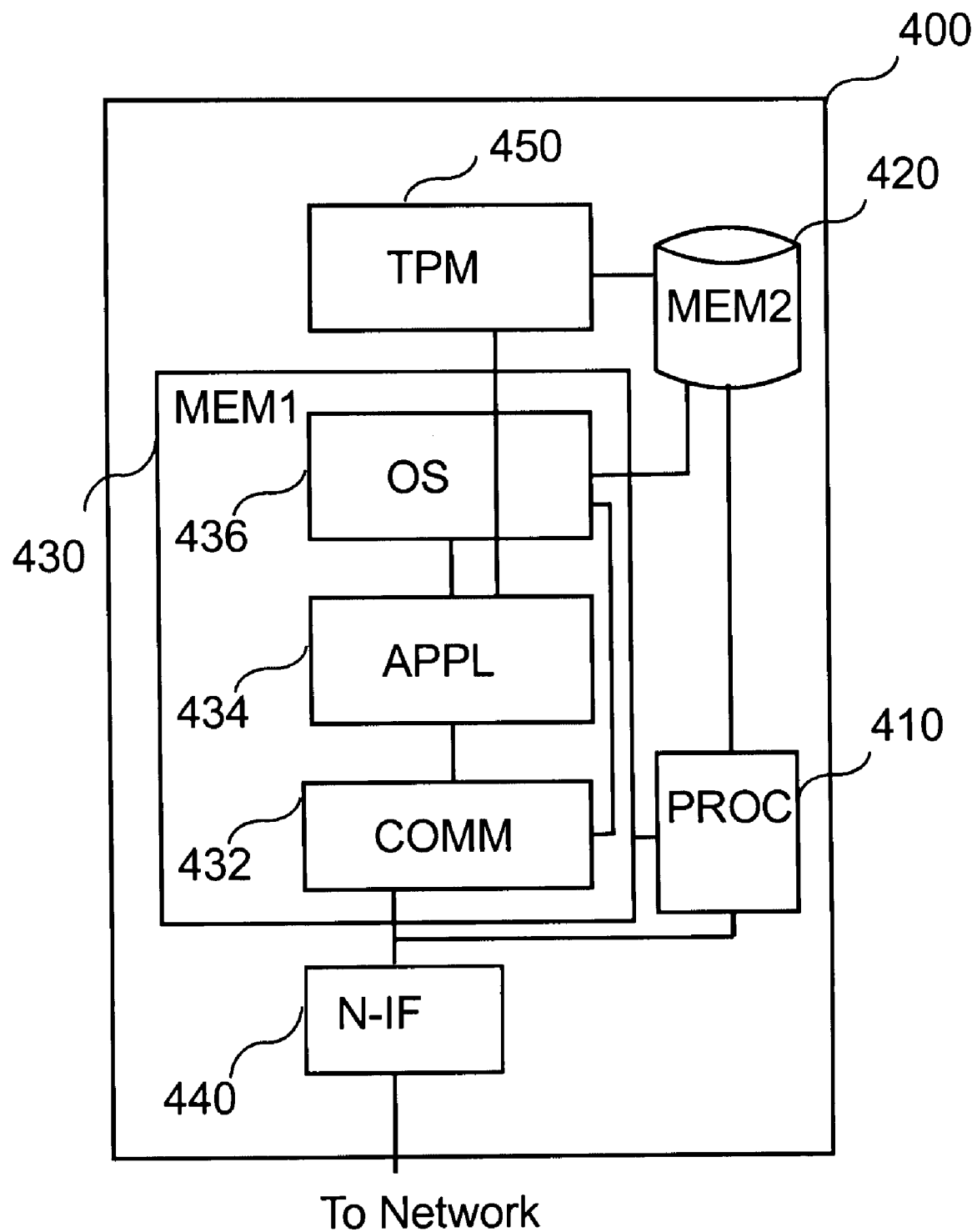
FIG. 4 is a block diagram illustrating an electronic device in one embodiment of the invention.

FIG. 4 is a block diagram illustrating an electronic device in one embodiment of the invention. The electronic device may be, for example, a mobile station, a laptop computer, a tabletop computer or a palmtop computer. The mobile station may be a mobile telephone, a personal digital assistant (PDA), a pager, a digital camera or camcorder, a position detection device, or any combination of the aforementioned. In FIG. 4 there is an electronic device 400. Electronic device 400 comprises a processor 410 and a secondary memory 420. The secondary memory may be, for example, a hard disk or a flash memory or an optic disk. Electronic device 400 comprises also a primary memory 430. When processor 410 executes functionalities associated with the invention primary memory 430 comprises, for example, a communication entity 432, an application entity 434 and an operating system entity 436. Electronic device 400 also comprises one or more network interface units such as network interface unit 440. Communication entity 432 comprises the communication functions, for example, Internet Protocol functions. Network interface 440 may be, a radio interface comprising, for example, a Wireless Local Area Network (WLAN) interface, a Bluetooth interface, a Wimax interface, a UWB (ultra wide band), low power radio frequency interface and a radio interface for a mobile telecommunication network. Electronic device 400 also comprises a trusted platform module 450, which communicates with operating system entity 436 and application entity 434. Within electronic device 400 there may also be software entities responsible for supporting the function of trusted platform module 450.

In one embodiment of the invention, communication entity 432 is comprised in the operating system of electronic device 400. The entities within electronic device 400 in FIG. 4, such as communication entity 432, application entity 434 and operating system entity 436 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, memory card, magnetic or optic disk. Some entities may be implemented as program modules linked to another entity. The entities in FIG. 4 may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (e.g., voice, modem, and the like), wireless communications media, one or more wireless communications networks, cellular communications networks, G3 communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method comprising:
   creating a first asymmetric key pair in a trusted platform module of a first electronic device, said first asymmetric key pair comprising a first public key and a first secret key;
   associating said first public key with trusted software platform state information within said first electronic device;
   certifying the association wherein association comprises concatenation of said first public key and said trusted software platform state information with an attestation identity key associated with said trusted platform module to produce a first certificate;

creating a second asymmetric key pair in an application within said first electronic device, said second asymmetric key pair comprising a second public key and a second secret key;
certifying said second public key with said first secret key to produce a second certificate;
signing a message with the second secret key to provide a message signature in said first electronic device; and
providing said message, said message signature, current software platform state information, said first certificate and said second certificate to a second electronic device.

2. The method according to claim 1, the method further comprising:
verifying said message signature with said first certificate and said second certificate in said second electronic device in order to verify a current software configuration of the first electronic device and that the first electronic device is the sender of the signed message.

3. The method according to claim 1, the method further comprising:
booting said first electronic device;
determining a current software platform state; and
providing said second secret key to said application from said trusted platform module if said current software platform state matches said trusted software platform state information.

4. The method according to claim 1, wherein the method further comprises:
associating said second secret key with said trusted software platform state information; and
storing the association of said second secret key with said trusted software platform state information in a permanent storage of said first electronic device.

5. The method according to claim 1, wherein the method further comprises:
storing said first certificate and said second certificate in a permanent storage.

6. The method according to claim 1, wherein the method further comprises:
computing hash values for at least one register using at least one software component;
using said hash values to determine new values for the at least one register; and
representing said trusted software platform state information with the values of said at least one register.

7. The method according to claim 6, wherein at least one register among said at least one register is reserved for an operating system or a communication application.

8. The method according to claim 1, wherein said first electronic device comprises a communication network node.

9. The method according to claim 1, wherein said first electronic device comprises a mobile communication device.

10. An electronic device, comprising:
an application entity configured to create a second asymmetric key pair, said second asymmetric key pair comprising a second public key and a second secret key, and to sign a message with the second secret key to provide a message signature in said electronic device;
a trusted platform module configured to create a first asymmetric key pair, said first asymmetric key pair comprising a first public key and a first secret key, to associate said first public key with trusted software platform state information, to certify the association wherein association comprises concatenation of said first public key and said trusted software platform state information with an attestation identity key associated with said trusted platform module in order to produce a first certificate, and to certify said second public key with said first secret key to produce a second certificate;
a communication entity configured to provide said message, said message signature, current software platform state information, said first certificate and said second certificate to a second electronic device.

11. The electronic device according to claim 10, the electronic device further comprising:
an operating system entity configured to boot said electronic device,
wherein said trusted platform module is further configured to determine a current software platform state and to provide said second secret key to said application entity from said trusted platform module if said current software platform state matches said trusted software platform state information.

12. The electronic device according to claim 10, wherein the electronic device further comprises:
a permanent storage,
wherein said trusted platform module is further configured to associate said second secret key with said trusted software platform state information and to store the association of said second secret key with said trusted software platform state information in said permanent storage.

13. The electronic device according to claim 10, wherein the electronic device further comprises:
a permanent storage,
wherein said trusted platform module is further configured to store said first certificate and said second certificate in said permanent storage.

14. The electronic device according to claim 10, wherein the electronic device further comprises:
at least one register,
wherein said trusted platform module is further configured to compute hash values for said at least one register with the program code of at least one software component, to use said hash values to determine new values for the at least one register, and to represent said trusted software platform state information with the values of said at least one register.

15. The electronic device according to claim 14, wherein said trusted platform module is further configured to reserve at least one register among said at least one register for an operating system.

16. The electronic device according to claim 14, wherein said trusted platform module is further configured to reserve at least one register among said at least one register for a communication application.

17. The electronic device according to claim 10, wherein said electronic device comprises a communication network node.

18. The electronic device according to claim 10, wherein said electronic device comprises a mobile communication device.

19. An electronic device, comprising:
means for creating a first asymmetric key pair in a trusted platform module of the electronic device, said first asymmetric key pair comprising a first public key and a first secret key;
means for associating said first public key with trusted software platform state information within said electronic device;
means for certifying the association wherein association comprises concatenation of said first public key and said trusted software platform state information with an attestation identity key associated with said trusted platform module to produce a first certificate;

means for creating a second asymmetric key pair in an application within said electronic device, said second asymmetric key pair comprising a second public key and a second secret key;

means for certifying said second public key with said first secret key to produce a second certificate;

means for signing a message with the second secret key to provide a message signature in said electronic device;

means for providing said message, said message signature, current software platform state information, said first certificate and said second certificate to a second electronic device.

20. A system, comprising:

a first electronic device configured to create a first asymmetric key pair in a trusted platform module of said first electronic device, said first asymmetric key pair comprising a first public key and a first secret key, to associate said first public key with trusted software platform state information within said first electronic device, to certify the association wherein association comprises concatenation of said first public key and said trusted software platform state information with an attestation identity key associated with said trusted platform module to produce a first certificate, to create a second asymmetric key pair in an application within said first electronic device, said second asymmetric key pair comprising a second public key and a second secret key, to certify said second public key with said first secret key to produce a second certificate, to sign a message with the second secret key to provide a message signature in said first electronic device, and to provide said message, said message signature, current software platform state information, said first certificate and said second certificate to a second electronic device; and a second electronic device configured to verify said message signature with said first certificate and said second certificate in order to verify a software configuration of the first electronic device and that the first electronic device is the sender of the signed message.

21. A non-transitory computer readable medium storing a computer program, the computer program comprising code for controlling a processor of an electronic device to execute a method comprising:

creating a first asymmetric key pair, said first asymmetric key pair comprising a first public key and a first secret key;

associating said first public key with trusted software platform state information;

certifying the association wherein association comprises concatenation of said first public key and said trusted software platform state information with an attestation identity key to produce a first certificate;

creating a second asymmetric key pair, said second asymmetric key pair comprising a second public key and a second secret key;

certifying said second public key with said first secret key to produce a second certificate;

signing a message with said second secret key to provide a message signature;

providing said message said message signature, current software platform state information, said first certificate and said second certificate to another electronic device.

22. The computer readable medium according to claim 21, wherein said computer readable medium is a removable memory card, a holographic memory, a magnetic disk or an optical disk.

23. The method according to claim 1, wherein associating said first public key with said trusted software platform state information comprises concatenating said first public key with said trusted software platform state information.

* * * * *